UNITED STATES PATENT OFFICE.

WILLIAM FITZ CHARLES MASON McCARTY, OF PLEASANTVILLE, NEW YORK.

PROCESS OF MAKING ARTIFICIAL STONE.

1,060,614.     Specification of Letters Patent.     Patented May 6, 1913.

No Drawing.     Application filed March 8, 1911. Serial No. 613,029.

*To all whom it may concern:*

Be it known that I, WILLIAM F. C. M. McCARTY, a citizen of the United States, residing at Pleasantville, in the county of Westchester and State of New York, have invented certain new and useful Improvements in Processes of Making Artificial Stone, of which the following is a specification.

This invention relates to artificial stone and has particular reference to a composition of this character adapted for use in building construction, and particularly in making tiles, columns, panels, capitals and also in making statuary, architectural ornaments, and the like.

Other objects and purposes of this invention will be apparent from the following description.

In the practice of my process I employ silica, preferably in the form of white sand, although some measure of success may be obtained by the employment of various silicates, as for example, the silicate of magnesia. Silicates are for the purpose of this invention chemical equivalents of the silica which I prefer to employ, and such silicates are considered to be referred to by the term "silica" as herein employed. The silica or silicate is first subjected to treatment with a mixture of concentrated nitric acid and hydrofluoric acid, the mixture being preferably in the approximate proportions of forty-eight parts of nitric acid to fifty-two parts of hydrofluoric acid, but these proportions may be widely varied. After mixing the acids the mixture is allowed to cool. The silica or silicate, preferably in powdered form, is mixed with it, preferably in approximately the proportions of six pounds of the mixed acid to each one hundred pounds of the silica. The mass is allowed to stand until the grains become softened so that they can be flattened between the finger and thumb. The resulting softened or plastic mass is then thoroughly mixed with silica, preferably in the proportions of about 20 p.. by weight of the plastic mass to one hundred parts by weight of the silica and the mixture is allowed to stand until the mass acquires a noticeable degree of plasticity, such as that of soft putty. To the plastic mass is then added a hardening reagent, preferably an alkaline-earth compound as lime oxid or calcined magnesia, previously moistened with water to about the consistency of mortar. This hardening reagent is added in the proportions which are shown by practice to give the best result, a matter readily determined by test with the particular materials under treatment. Satisfactory results may however, be obtained by employing from 100 to 150 parts by weight of the hardening reagent, not including the water, to one hundred parts by weight of the plastic mass. The hardening reagent is thoroughly incorporated in the plastic mass and the mixture allowed to crystallize and harden in suitable molds, preferably molds with smooth glass or polished metal sides. I have found it advantageous to add an organic acid, preferably acetic acid, to the mass before it hardens. This acid may be added before of with the hardening reagent or after such hardening reagent is added, but before the mass hardens. The organic acid is preferably added in proportions from one to three parts by weight of the acid to one hundred parts of the plastic mass.

I have found that a very attractive appearance is imparted to my artificial stone by brushing over the surface thereof after such mass has wholly or partially set, but before it is dry, a solution or emulsion of oxid of zinc in water. The appearance of the product is still further improved by following this treatment with zinc oxid with a similar treatment with a solution of chlorid of zinc. The finished mass requires from about twelve to thirty-six hours to thoroughly harden, after which it may be handled and used the same as marble or other stone.

While I have described in detail the preferred proportions and ingredients, it is to be understood that such proportions may be widely varied and that chemical equivalents of the re-agent may be employed within the spirit of my invention and without departing from the scope of the appeneded claims.

Having thus described my invention, I claim:—

1. The herein described process which consists in adding to silica a softening reagent consisting of nitric and hydrofluoric acids, adding to the resulting plastic mass a hardening reagent comprising an alkaline-earth, compound, and permitting the resulting mass to harden.

2. The herein described process, which consists in adding to silica a softening reagent, mixing the resulting softened mass with silica, adding to the mixture a hardening reagent, and permitting the resulting mass to harden.

3. The herein described process, which consists in adding to silica a softening reagent, mixing the resulting softened mass with silica, adding to the mixture a hardening reagent consisting of a compound of an alkaline-earth metal, and permitting the resulting mass to harden.

4. The herein described process, which consists in adding to silica a softening reagent comprising nitric and hydrofluoric acids, mixing the softened mass with silica and adding to the mixture a hardening reagent comprising a compound of an alkaline-earth metal, and permitting the mass to harden.

5. The herein described process, which consists in adding to silica a softening reagent, incorporating in the mass a compound of an alkaline-earth metal and an organic acid, and permitting such mass to harden.

6. The herein described process, which consists in adding to silica a softening reagent comprising nitric and hydrofluoric acids, adding to the resulting plastic mass a hardening reagent comprising a compound of an alkaline-earth metal and an organic acid, and permitting the mass to harden.

7. The herein described process, which consists in adding to silica a softening reagent comprising nitric and hydrofluoric acids, adding to the resulting plastic mass a hardening reagent comprising an alkaline-earth compound and an organic acid, applying to the surface of the mass a solution of zinc oxid, and permitting the said mass to harden.

8. The herein described process, which consists in adding to silica a softening reagent comprising nitric and hydrofluoric acid, incorporating in the softened mass a hardening reagent comprising a salt of an alkaline-earth metal and an organic acid, applying to the surface of the mass a solution of oxid of zinc and thereafter applying to the said surface a solution of chlorid of zinc, and permitting the mass to harden.

9. The herein described process, which consists in adding to silica a softening reagent comprising nitric and hydrofluoric acids, mixing the softened mass with silica, adding to such mixture a hardening reagent comprising an alkaline-earth compound and an organic acid, applying to the surface of the mass a solution of zinc oxid and thereafter applying to the surface of such mass a solution of zinc chlorid, and permitting the mass to harden.

In testimony whereof I affix my signature in presence of two witnesses.

WILLIAM FITZ CHARLES MASON McCARTY.

Witnesses:
 GEO. H. HAIGHT, Jr.,
 GEORGE W. DERLY.